United States Patent [19]
Wu

[11] Patent Number: 6,124,822
[45] Date of Patent: Sep. 26, 2000

[54] PANEL-MOUNTED GARAGE DOOR REMOTE CONTROL

[76] Inventor: Sammy K. Y. Wu, 80 W. Avondale Rd., Hillsborough, Calif. 94010

[21] Appl. No.: 09/111,434

[22] Filed: Jul. 7, 1998

[51] Int. Cl.[7] ................................................ G08C 19/12
[52] U.S. Cl. ...................... 341/176; 296/37.7; 455/128; 307/9.1
[58] Field of Search ........................... 341/176; 455/99, 455/128; 296/37.7, 72; 307/9.1

[56] References Cited

U.S. PATENT DOCUMENTS

| | | | |
|---|---|---|---|
| 3,936,833 | 2/1976 | Bush | 341/176 |
| 4,241,870 | 12/1980 | Marcus | 296/37.7 |

Primary Examiner—Michael Horabik
Assistant Examiner—Timothy Edwards, Jr.
Attorney, Agent, or Firm—Jack Lo

[57] ABSTRACT

A panel-mounted garage door remote control is comprised of a housing with a front end removably fitted into a sleeve on a mounting bezel. Conventional remote control circuitry is arranged in the housing. A pair of control switches at the front of the housing are in engagement with buttons on the bezel, and an indicator lamp at the front of the housing is positioned through a hole on the bezel. The remote control is inserted into an existing accessory mounting hole in an interior panel of a car. The bezel is sized to fit flush with the surface of the hole to provide a neat appearance. The housing is interchangeable with other bezels sized to fit accessory mounting holes in different cars.

9 Claims, 1 Drawing Sheet

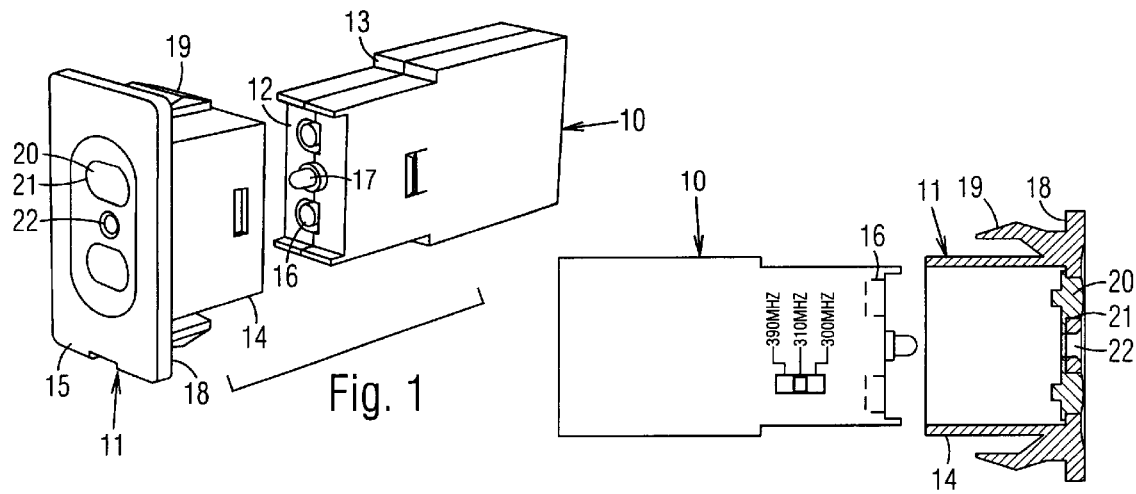
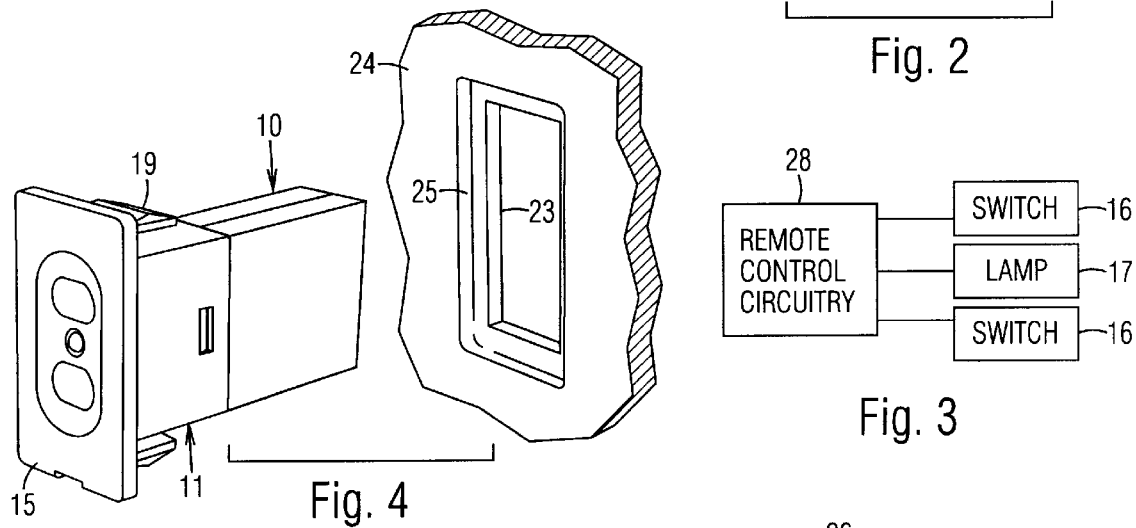
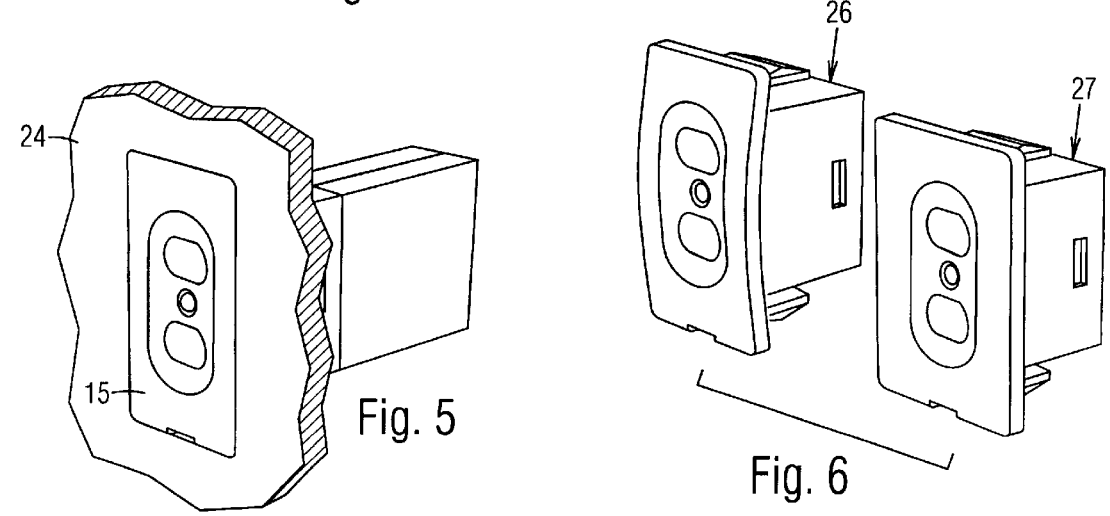

PANEL-MOUNTED GARAGE DOOR REMOTE CONTROL

BACKGROUND OF THE INVENTION

1. Field of the Invention

This invention relates generally to garage door remote controls.

2. Prior Art

A typical garage door remote control is the size of a cigarette pack, and has a clip for clipping onto a visor in a car. It is thus an obvious piece of add-on equipment which is relatively large and unattractive, so that it mars the interior design of the car. Because it is separate from the car, it can also be easily misplaced.

OBJECTS OF THE INVENTION

Accordingly, objects of the present garage door remote control are to be mountable in an existing accessory mounting hole in an interior panel of a car to provide a neat appearance and so that it cannot be misplaced; and to be mountable in different size holes in different cars. Further objects of the present invention will become apparent from a consideration of the drawings and ensuing description.

BRIEF SUMMARY OF THE INVENTION

A panel-mounted garage door remote control is comprised of a housing with a front end removably fitted into a sleeve on a mounting bezel. Conventional remote control circuitry is arranged in the housing. A pair of control switches at the front of the housing are in engagement with buttons on the bezel, and an indicator lamp at the front of the housing is positioned through a hole on the bezel. The remote control is inserted into an existing accessory mounting hole in an interior panel of a car. The bezel is sized to fit flush with the surface of the hole to provide a neat appearance. The housing is interchangeable with other bezels sized to fit accessory mounting holes in different cars.

BRIEF DESCRIPTION OF THE SEVERAL VIEWS OF THE DRAWING

FIG. 1 is a front perspective exploded view of the present panel-mounted garage door remote control.

FIG. 2 is a partial cutaway exploded view of the remote control.

FIG. 3 is a block diagram of the remote control.

FIG. 4 is a front perspective view of the remote control about to be inserted into an accessory mounting hole in an interior panel of a car.

FIG. 5 is a front perspective view of the remote control mounted in the accessory mounting hole.

FIG. 6 is a front perspective view of additional mounting bezels for the remote control.

DRAWING REFERENCE NUMERALS

| | |
|---|---|
| 10. Housing | 11. Bezel |
| 12. Front End | 13. Shoulders |
| 14. Sleeve | 15. Face Plate |
| 16. Switches | 17. Indicator Lamp |
| 18. Flange | 19. Clips |
| 20. Buttons | 21. Holes |
| 22. Hole | 23. Mounting Hole |
| 24. Vehicle Interior Panel | 25. Shoulder |
| 26. Bezel | 27. Bezel |
| 28. Remote Control Circuit | |

DETAILED DESCRIPTION OF THE INVENTION

FIGS. 1–3:

A preferred embodiment of the panel-mounted garage door remote control is shown in a front perspective view and a side view in FIGS. 1–2. It is comprised of an elongated housing 10 and an interchangeable mounting bezel 11. Housing 10 includes a front end 12 with shoulders 13 on opposite sides for removably fitting into a sleeve 14 extending orthogonally from the back of a face plate 15 of bezel 11. A pair of control switches 16 and an indicator lamp 17 are arranged on front end 12 of housing 10, and are connected to a conventional garage door remote control circuit 28 therein, as shown in the block diagram in FIG. 3. Face plate 15 of bezel 11 is wider and taller than sleeve 14, so that a flange 18 is formed around the perimeter of sleeve 14. A pair of retaining clips 19 are attached to opposite sides of sleeve 14. A pair of buttons 20 are movably positioned in holes 21 on face plate 15. The back of buttons 20 are arranged to engage switches 16 when housing 10 is inserted into sleeve 14, so that switches 16 are activated by pressing buttons 20. Lamp 17 is arranged to extend through a hole 22 on face plate 15.

FIGS. 4–5:

Many car interior panels have cover plates sealing unused accessory mounting holes that are originally intended for being factory fitted with optional accessories, such as switches, coin holders, etc. An exemplar mounting hole 23 on a vehicle interior panel 24 is shown in FIG. 4. Vehicle interior panel 24 may be a dashboard, a center console, a door panel, etc. The cover plate for hole 23 is removed. Hole 23 includes a shoulder 25 around its rim. The present remote control is sized and shaped to fit into hole 23, and is retained therein by clips 19. Face plate 15 is sized for being seated on shoulder 25 and fitting flush with the surface of vehicle interior panel 24. As shown in FIG. 5, the remote control is neatly mounted in vehicle interior panel 24 to provide the appearance of a factory-installed accessory that blends in with the interior of the car. Thus mounted, it cannot be misplaced, and it is also within easy reach of the driver.

FIG. 6:

A plurality of interchangeable bezels, such as bezels 26 and 27, of other shapes and sizes may be provided for mounting the remote control housing in accessory mounting holes in different cars.

SUMMARY AND SCOPE

Accordingly, a panel-mounted garage door remote control is provided. It can be mounted in an existing accessory mounting hole in an interior panel of a car to provide a neat appearance and so that it cannot be misplaced. It can also be mounted in different size holes in different cars.

Although the above description is specific, it should not be considered as a limitation on the scope of the invention, but only as an example of the preferred embodiment. Many substitutes and variations are possible within the teachings of the invention. For example, any suitable remote control circuitry can be provided. Interchangeable bezels in a variety of other shapes and sizes can be provided for mounting the remote control housing in the interior panel. More or fewer switches can be provided, and the lamp can be eliminated. Therefore, the scope of the invention should be determined by the appended claims and their legal equivalents, not by the examples given.

I claim:

1. A panel-mounted garage door remote control for a car, comprising:

an elongated housing for being inserted longitudinally into an accessory mounting hole in an interior panel of said car;

a garage door remote control circuit received in said housing for remotely operating a garage door;

a face plate with a rear side attached to a front end of said housing, said face plate being wider and taller than said housing for engaging and fully covering a recessed shoulder completely around a rim of said accessory mounting hole; and a button positioned on a front side of said face plate and arranged to actuate said garage door remote control circuit.

2. The panel-mounted garage door remote control of claim 1, further including a pair of clips positioned on opposite sides of said housing for engaging a rear side of said accessory mounting hole and retaining said housing in position.

3. The panel-mounted garage door remote control of claim 1, further including a hole extending through said face plate, said button being movably positioned in said hole, said button being positioned to engage and actuate a switch on said front end of said housing.

4. A panel-mounted garage door remote control for a car, comprising:

a mounting bezel including a face plate and a tubular sleeve extending orthogonally from a rear side of said face plate, said sleeve for being inserted into an accessory mounting hole in an interior panel of said car, said face plate being wider and taller than said sleeve for engaging and fully covering a recessed shoulder completely around a rim of said accessory mounting hole;

a button positioned on a front side of said face plate;

a housing having a front end removably secured within said sleeve, said housing being removable from said mounting bezel for attaching to another mounting bezel of another shape for fitting another accessory mounting hole; and a garage door remote control circuit received in said housing and responsive to actuation of said button for remotely operating a garage door.

5. The panel-mounted garage door remote control of claim 4, further including a pair of clips positioned on opposite sides of said sleeve for engaging a rear side of said accessory mounting hole and retaining said mounting bezel in position.

6. The panel-mounted garage door remote control of claim 4, further including a hole extending through said face plate, said button being movably positioned in said hole, said button being positioned to engage and actuate a switch on said front end of said housing.

7. A panel-mounted garage door remote control for a car, comprising:

a plurality of interchangeable mounting bezels sized and shaped for fitting different accessory mounting holes in an interior panel of said car, each of said mounting bezels including a face plate and a tubular sleeve extending orthogonally from a rear side of said face plate, said sleeve for being inserted into one of said accessory mounting holes, said face plate being wider and taller than said sleeve for engaging and fully covering a recessed shoulder completely around a rim of said one of said accessory mounting holes;

a button positioned on a front side of said face plate;

a housing having a front end removably attached within said sleeve of one of said mounting bezels, said housing being attachable to any one of said mounting bezels; and a garage door remote control circuit received in said housing and responsive to actuation of said button for remotely operating a garage door.

8. The panel-mounted garage door remote control of claim 7, further including a pair of clips positioned on opposite sides of said sleeve for engaging a rear side of said one of said accessory mounting holes and retaining said mounting bezel in position.

9. The panel-mounted garage door remote control of claim 7, further including a hole extending through said face plate, said button being movably positioned in said hole, said button being positioned to engage and actuate a switch on said front end of said housing.

* * * * *